United States Patent
Stoicescu et al.

(10) Patent No.: US 8,739,144 B2
(45) Date of Patent: May 27, 2014

(54) COMPILER OPTIMISATION LIKE IDIOM RECOGNITION THROUGH PATTERN MATCHING USING VALUE NUMBERING

(75) Inventors: Mihai Emanuel Stoicescu, Richmond (CA); Bogdan Florin Ditu, Ploiesti (RO); Mihail Popa, Bucuresti (RO)

(73) Assignee: Freescale Semiconductor, Inc., Austin, TX (US)

( * ) Notice: Subject to any disclaimer, the term of this patent is extended or adjusted under 35 U.S.C. 154(b) by 254 days.

(21) Appl. No.: 13/129,845

(22) PCT Filed: Dec. 17, 2008

(86) PCT No.: PCT/IB2008/055382
§ 371 (c)(1), (2), (4) Date: May 18, 2011

(87) PCT Pub. No.: WO2010/070384
PCT Pub. Date: Jun. 24, 2010

(65) Prior Publication Data
US 2011/0225572 A1    Sep. 15, 2011

(51) Int. Cl.
*G06F 9/45* (2006.01)

(52) U.S. Cl.
CPC .............. *G06F 8/4435* (2013.01); *G06F 8/443* (2013.01); *G06F 8/4434* (2013.01)
USPC ........................... 717/155; 717/151; 717/154

(58) Field of Classification Search
CPC ...... G06F 8/443; G06F 8/4434; G06F 8/4435
USPC ................................... 717/151–161
See application file for complete search history.

(56) References Cited

U.S. PATENT DOCUMENTS

| | | | | |
|---|---|---|---|---|
| 6,035,124 A * | 3/2000 | Ng | ............................... | 717/159 |
| 6,077,314 A * | 6/2000 | Ng | ............................... | 717/159 |
| 6,202,203 B1* | 3/2001 | Ng | ............................... | 717/151 |
| 6,895,580 B2* | 5/2005 | Bates et al. | ................... | 717/157 |
| 7,140,006 B2* | 11/2006 | Harrison et al. | .............. | 717/152 |
| 7,966,609 B2* | 6/2011 | Serebryany | ................... | 717/151 |
| 8,127,281 B2* | 2/2012 | Tal | ............................... | 717/144 |
| 2003/0056083 A1* | 3/2003 | Bates et al. | ..................... | 712/20 |

(Continued)

FOREIGN PATENT DOCUMENTS

| WO | 2006/020729 A2 | 2/2006 |
| WO | 2007/114722 A | 10/2007 |

OTHER PUBLICATIONS

Jenks, Richard D., "A Pattern Compiler," 1976, ACM, p. 60-65.*

(Continued)

*Primary Examiner* — Qing Chen

(57) ABSTRACT

A compiler and method for compiling source code comprising: a library of code patterns and control flow information for each code pattern, wherein each code pattern comprises one or more variable; and a processor arranged to: evaluate the control flow of an expression in the source code, wherein the expression comprises one or more variable, match the expression to one of the code patterns in the library based on the evaluated control flow information, assign value numbers to the one or more variable within the expression, determine if the expression and the matched code pattern are equivalent based on the assigned value numbers, and replace the expression in the source code with a replacement expression if the expression and the matched code pattern are equivalent.

20 Claims, 2 Drawing Sheets

(56) References Cited

U.S. PATENT DOCUMENTS

| | | | |
|---|---|---|---|
| 2003/0101441 A1* | 5/2003 | Harrison et al. | 717/152 |
| 2004/0255278 A1* | 12/2004 | Bates et al. | 717/129 |
| 2007/0094646 A1 | 4/2007 | Higham | |
| 2008/0235676 A1* | 9/2008 | Serebryany | 717/154 |
| 2009/0157721 A1* | 6/2009 | Tal | 707/102 |

OTHER PUBLICATIONS

Moreau et al., "A Pattern Matching Compiler for Multiple Target Languages," 2003, Springer-Verlag, p. 61-76.*

Samuel Z Guyer and Calvin Lin: "Optimizing the Use of High Performance Software Libraries" Lecture Notes in Computer Science, Springer Verlag, Berlin; DE, vol. 2017, Jan. 1, 2001, pp. 227-243.

Kawahito M et al: "A New Idiom Recognition Framework for Exploiting Hardware-Assist Instructions" Operating Systems Review ACM USA, vol. 40, No. 5, Dec. 2006, pp. 382-393.

Muchnick S: "Value Numbering" Advanced Compiler Design and Implementation, Jan. 1, 1997, pp. 343-355, 407.

Cooper Keith D et al: "Engineering a Compiler" Elsevier, Computer Science Book, ISBN/9780120884780, Section 8.3.2, 2004, pp. 1-824.

International Search Report and Written Opinion correlating to PCT/IB2008/055382 dated Sep. 7, 2009.

* cited by examiner

COMPILER OPTIMISATION LIKE IDIOM RECOGNITION THROUGH PATTERN MATCHING USING VALUE NUMBERING

FIELD OF THE INVENTION

This invention relates to a compiler and method for compiling source code.

BACKGROUND OF THE INVENTION

Computer programmers typically write in a high level programming language such as C, because it is easily read by developers and may be more easily maintained than machine code. Compilers translate this human readable program code, known as source code, into computer executable code. As well as carrying out this translation, compilers may also optimize the source code and perform other tasks, such as making architecture specific formatting. Optimization may include finding redundant code or portions of code that can never be reached, which may then be removed during the compilation process.

Further optimizations may include replacing inefficient expressions with equivalent improved efficiency expressions. However, it is often difficult for a compiler to determine whether or not complex expressions are equivalent. Rather than replacing an expression or portion of source code with one that is not equivalent the compiler may simply leave the source code unchanged to avoid any risk or unstable result. The compiler may only substitute source code when it is certain that the substitute is semantically and functionally equivalent to the original source code.

However, this can leave inefficient or redundant expressions within the source code leading to less efficient compiled executable code.

SUMMARY OF THE INVENTION

The present invention provides a compiler and method for compiling source code as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE EMBODIMENTS

Figure 1:
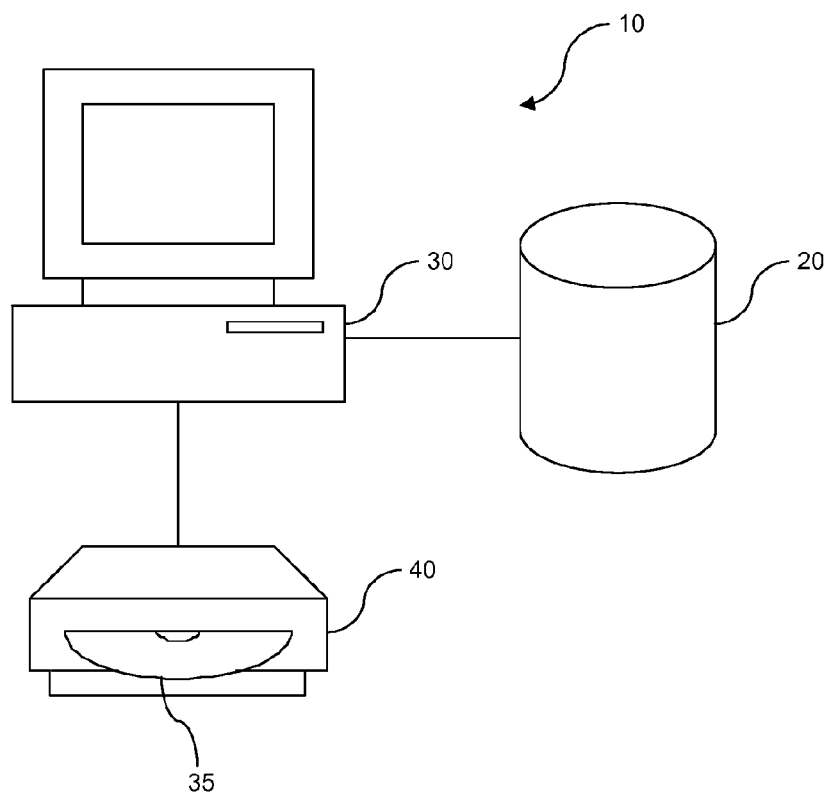
FIG. 1 schematically shows an example of an embodiment of a compiler.

According to an example of the present invention there is provided a compiler for compiling source code comprising: a library of code patterns and control flow information for each code pattern, wherein each code pattern comprises one or more variable; and a processor arranged to: evaluate the control flow of an expression in the source code, wherein the expression comprises one or more variable, match the expression to one of the code patterns in the library based on the evaluated control flow information, assign value numbers to the one or more variable within the expression, determine if the expression and the matched code pattern are equivalent based on the assigned value numbers, and replace the expression with a replacement expression if the expression and the matched code pattern are equivalent. The library may be predetermined and comprise a set of code patterns. In preparing the library, each code segment may be associated with its control flow information. This control flow information may be determined by any suitable technique and stored in a convenient format. The compiler may identify expressions from the source code as candidates for evaluation. Once an expression (i.e. a code segment candidate) has been identified, which may, for instance, be by finding a complete procedure or function, the control flow information from that identified expression may be determined, again in any suitable way, including graphically. The control flow information for the identified expression may then be used to find a match with one or more of the code patterns in the library.

An expression may be a function, set of instructions, operator, pattern, sub-routine, program or one or more lines of code found within a set of source code. The expression may contain logic, variables, constants, pointers, and assignments of variables or other computer defined instructions forming part of a larger computer program. Variables may be assigned values or arrays of varying data that changes during execution, for instance.

Expressions that are equivalent may perform the same overall operation and have the same results even though different intermediate steps may be taken. However, equivalent expressions may use different variables or other devices to reach the same conclusion or result or use different computer resources or steps to get there.

Once a control flow match is found, value numbers may be assigned to any or all variables and/or operands within both the expression (or code segment candidate) and the matched code pattern from the library. Alternatively, the code patterns in the library may have associated with them pre-assigned, pre-computed, predetermined or stored value numbers (either within the library or external to it). Value numbering is a technique used in compilers to identify redundant expressions within source code. An example of this technique may be found in "Engineering a Compiler", Keith D. Cooper, Linda Torczon, Published by Elsevier, 2004, ISBN 155860698X, 9781558606982 (see for instance, section 8.3.2). However, instead of comparing expressions found only within source code, a similar value numbering check is made to determine if the expression (or source code candidate) is equivalent to the matched code pattern or segments identified in the library. If it is determined that the expression and a matched code pattern are equivalent (for instance semantically and/or logically) then the expression may be replaced (in the source code or a representation of the source code stored for use during compilation or optimization) with a replacement expression stored either within or external (e.g. in distributed storage) to the library and associated with the matched code pattern. An advantage of replacing the expression may be to provide the source code with a more efficient, faster or optimized code segment or overall control flow. Source code may also include a representation of the source code stored or used within the compiler. Value numbering may be used to determine equivalence more reliably than data flow or other techniques alone. Therefore, the resultant amended source code may be improved further than other compilers would achieve.

The compiler may optimize the source code as one stage of a full compilation process or fully compile the source code.

In an example, the processor may be further arranged to check further conditions prior to replacing the expression in the source code. These other conditions may prevent unstable or incorrect code being replaced in specific circumstances and may allow other optimizations to take place without resulting in incorrect compiled code.

In an example, the equivalence may be determined by verifying that value number propagation in the expression is similar to value number propagation in the matched code pattern. The assignment of value numbers may be used to follow the data flow to identify the equivalence of the expression and the code pattern.

In an example, the match of the expression and one of the code patterns may be further based on the control flow graphical structure.

In an example, the match of the expression and one of the code patterns may be further based on dominating conditions.

In an example, the expression may further comprise an operator, operand or program logic.

In an example, the value number assignment uses a static single assignment form or a hash table.

In an example, the replacement expression and the matched code pattern may be different entities associated with each other. The replacement expression may be the same expression as that determined to be equivalent or may be a different code segment associated with the code pattern and determined in advance to be equivalent. The library may store replacement expressions and associate them with one or more code patterns. Some code patterns may be used directly as replacements, whilst others may instead require associated replacements under some or all circumstances or conditions. The expression may be evaluated further to amend or adjust the replacement so that it contains the correct operands or other components (e.g. variables and constants). The replacement may also be generated based on information generated during the value numbering procedure.

In an example, the replacement expression and the matched code pattern are associated with each other in the library.

In an example, the library may further comprise value numbers associated with the code patterns.

In an example, the expression may be replaced in the source code or within a representation of the source code stored within the compiler.

In an example, the replacement expression may be generated from the matched code pattern.

In an example, the replacement expression may be generated from an alternative code pattern associated with the matched code pattern.

In an example, the replacement expression may be further generated from one or more operands of the expression (120) in the source code.

According to a further example of the present invention there is provided a method for compiling source code comprising the steps of: evaluating the control flow of an expression in the source code, wherein the expression comprises one or more variable; matching the expression to a code pattern in a library based on the evaluated control flow and the control flow of the code pattern, wherein each code pattern in the library comprises one or more variable; assigning value numbers to the one or more variable within the expression; determining if the expression and the matched code pattern are equivalent based on the assigned value numbers; and replacing the expression with a replacement expression if the expression and the matched code pattern are equivalent. This method may be recorded as a computer program and carried out on a suitable computer system. The method may include any one or more of the alternative example features described above.

FIG. 1 shows a schematic diagram of a compiler system 10 according to an example embodiment. A library 20 of code patterns may be stored in a database or other storage mechanism. Individual code patterns may be retrieved from the library 20 by a processor 30 forming part of a computer system. Source code may be read by the processor 30 from a storage device, such as a disk drive 40, having removable or permanent storage 35. The processor 30 may receive the source code in any convenient form including plain text and this source code may be received via a network or other input source. The processor may be a desktop PC or server running an operating system such as Windows®, UNIX, Linux, OS X or similar, for instance.

The processor 30 may generate compiled code, object code or executable code in a suitable format for use in any specific architecture or processor or sent for further processing. Example architectures include but are not limited to desktop architectures such as x86 and Power Architecture, Microcontrollers such as Freescale HC08 and HC12 or Digital Signal Processors such as, StarCore, for instance. The object code or executable code may then be run on an integrated circuit or computer platform.

Figure 2:
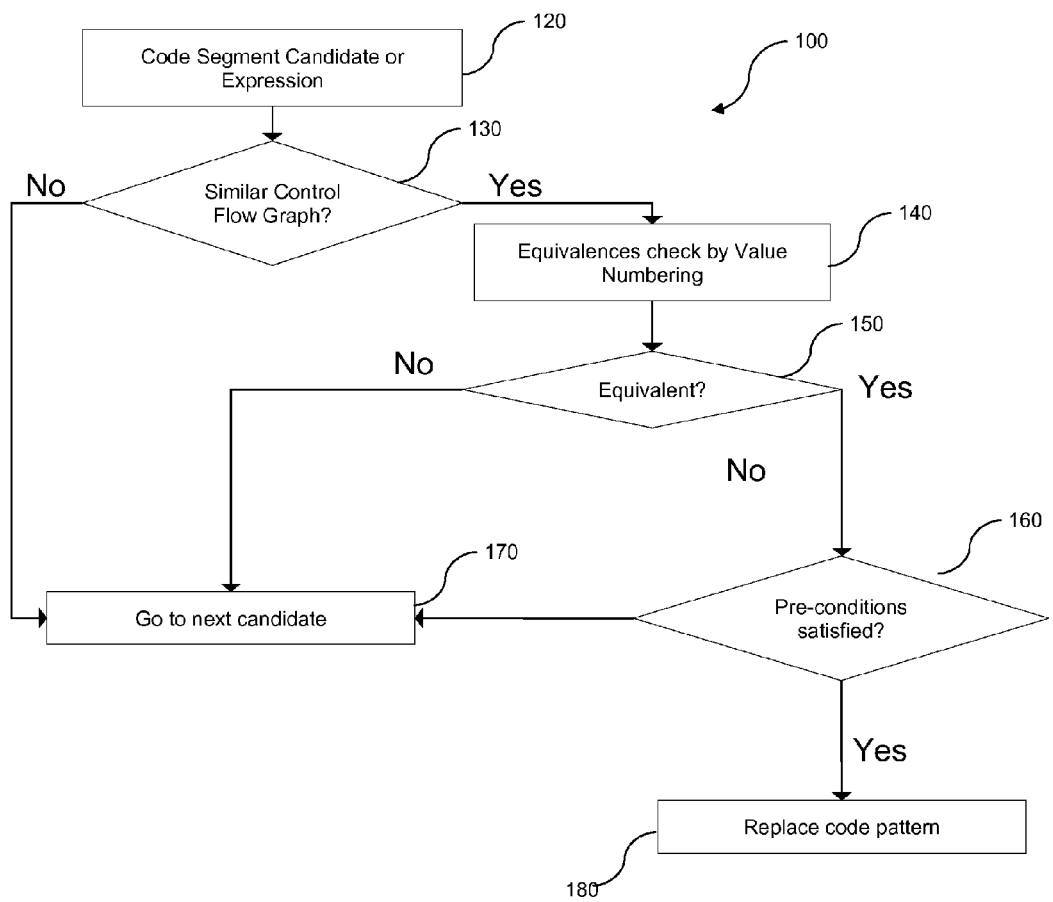
FIG. 2 schematically shows a flow diagram of an example method for compiling computer source code.

FIG. 2 shows a flow chart of an example method 100 for compiling source code. This method may be run on the complier system 10 described above. For simplicity, not all of the steps of the compiler are shown, including those steps common to conventional compilers.

A code segment candidate or expression 120 is identified in the source code. This code segment candidate 120 may be identified by for instance, parsing the source code to locate individual expressions or functions. Control flow information, such as a control flow graph, is built for the expression or code segment candidate 120 and this control flow graph is evaluated by comparing the control flow graph with control flow graphs stored in the library 20 in a convenient format. If no similar control flow graph or information is found then the method may move on to the next candidate code segment at step 170. If a similar control flow graph 130 is found in the library 20 then a code pattern, associated with the matched control flow graph 130 may be retrieved from the library 20 for comparison against the code segment candidate 120. The code segment candidate or expression 120 is checked to determine its equivalence with the code pattern from the library 20. This equivalence check is carried out by performing a value numbering procedure at step 140. Value numbering may be carried out using a static single assignment form or hash table.

After an expression is identified in the source code (i.e. a candidate expression), its control flow is evaluated and compared with that of code patterns in the library 20. This may be achieved by comparing the structure of the control flow of the candidate expression and those of the code patterns and identifying any matched code patterns. For instance, this comparison may look at the same types of blocks and the same relations between them and also the same control-flow related instructions (e.g. comparisons and branches). Further checks may be made to determine if candidate expression from the source code contains the same operations as the matched code pattern in the library 20. This further operation may help to speed up the compilation or optimisation process.

The control flow representation or information may be in any suitable form. These forms may include any of the classical or known forms, for instance Control Flow Graph (CFG) or Control Dependence Graph (CDG). This control flow information may be stored in the library 20 in an internal convenient representation or format of any of these classical representations.

Value numbering may be carried out by assigning value numbers to any variables or operands within both the expression 120 and any identified or matched code patterns. Alternatively, the value numbering of the code patterns in the library 20 may be predetermined in order to speed up the process. Operands or variables may be found to be equivalent if they store the same value or for instance if the values of operands and their propagation through a code pattern is similar to that of the code segment candidate 120. It is not necessary to introduce specific values to determine equivalence as value numbers may instead be followed through. If equivalence (or the operands are found to be similar based on the value numbering operation) is not found at step 150 then the method moves on to the next code segment candidate 170. If, however, equivalence is found at step 150 then further pre-conditions may be checked if required at step 160. In general these pre-conditions may refer to exceptional circumstances that may be encountered. For instance, in certain code segments or types of code segments it may be a requirement that operands are signed. If a replacement did not (or could no) contain signed operands the result may not be safe as it would not result in semantically equivalent or stable code. In another example, certain expressions may not be used with floating point values as such data types may not be usable in the replacement expression. In another example, certain expressions may not be applied to operands having certain qualifiers. In another example, certain expressions may not be replaced if more than a certain number of machine instructions would run causing side effects in other optimizations. In another example, certain expressions or code segment candidates 120 may not be suitable for replacement if they are only able to operate within a certain range of values for a particular target architecture. In another example, certain expressions may not be replaced in certain "flavour" of architectures especially if the replacement is not supported by certain groups of architectures.

If the pre-conditions are all met at step 160 (or if there are no pre-conditions to be checked) the code segment candidate 120 in the source code may be replaced with a replacement code expression or code segment 180. This replacement code expression 180 may be the same code that was checked for equivalence at step 140 or maybe an equivalent code expression associated with the code pattern and having the same functionality or result. The library 20 may store all of these alternatives or the storage may be distributed. If any of the pre-conditions are not satisfied then the replacement is not made and the method again returns to a further code segment candidate 120 until all expressions 120 are either replaced or checked and left unamended. Once all code segment candidates 120 have been exhausted then the method may stop and other functions of the compiler may be implemented or the resulting source code is saved in this optimized state.

The library 20 may store the code patterns to be matched with the source code, control flow information for each code pattern, value numbers for each stored code pattern and may also contain a replacement expression equivalent to the code pattern. The replacement expression may be in a form suitable to receive the operands of the expression in the source code so that expression may be replaced without affecting or changing the logic or result of the original source code. Alternatively, the value numbers for the code patterns may be assigned at the same time that value numbers are assigned to the code patterns from the source code.

The following examples are provided to illustrate the determination of the equivalence step using value numbering. The parsing or expression identifying step may result in a code segment candidate or expression 120 that is an "if" statement denoted as Function 1, for example.

```
if ( a[i] < b[j+1] )                  Function 1
{
    a[i] = b[j+1];
}
``` variables a, b, l and j act as operands on Function 1. Function 2 represents a code pattern stored in library 20 for comparison.

```
if ( a < b )                          Function 2
{
    a = b;
}
```

The Value Numbering terminology in the following value number sets provides V(a) as the value of a, with a subscript "if" used for the if statement and the subscript "as" used for the assignment operation (a=b) with the subscript "aas" for after the assignment and "bas" for before the assignment. Providing value numbers to each Function may therefore result in:

$$V(a[i]_{aas}) = V(b[j+1]_{as})$$

$$V(b[j+1]_{if}) = V(b[j+1]_{as})$$

$$V(a[i]_{bas}) = V(a[i]_{if}) \qquad \text{Value Number Set 1}$$

and $$V(a_{aas}) = V(b_{as})$$

$$V(b_{if}) = V(b_{as})$$

$$V(a_{bas}) = V(a_{if}) \qquad \text{Value Number Set 2}$$

Value Number Set 1 is found for the code segment candidate 120. Value Number Set 2 is found for the code pattern (Function 2) from the library 20. By comparing Value Number Sets 1 and 2 it can be determined that both functions are equivalent as they result in value numbers having the same form.

Function 3 is associated with Function 2 in the library 20. Function 3 is equivalent semantically to Function 2 but may be carried out in fewer or more efficient processing steps when compiled. In this example, it can be seen that Function 1 and Function 2 are semantically equivalent and all that is required is a translation of variables so that the operands of Function 1 and its replacement (Function 3) are consistent. Once the operands match, Function 3 translates to Function 4. Therefore, Function 1 in the source code may be replaced by Function 4. In other words, an expression in the source code is found to be semantically equivalent to an alternative expression using value numbering. The alternative expression is not used directly in this example but is instead associated with a replacement function known in advance to be equivalent.

$$a = \max(a,b);\qquad\text{Function 3}$$

$$a[i] = \max(a[i], b[j+1]);\qquad\text{Function 4}$$

The following second example shows a more complex set of functions that may be identified as candidates for replacement using value numbering. In this example the original source code expression may otherwise be too complex for other compiler optimizations to operate on. Function 5 is a more complex code segment candidate or expression 120 found in the source code. For Function 5 to exist two structures S1 and S2 may be defined, as shown in Function 6.

```
if ( a.index->str[i] < b.str[j])         Function 5
{
   a.index->str[i] = b.str[j];
}
struct S1;                               Function 6
struct S2;
struct S1
{
   struct S2 *index;
   /* ... */
};
struct S2
{
   char str[N];
   /* ... */
};
struct S1 a;
struct S2 b;
``` a.index->str[i] refers to the "i"-th member of the char array in the "S2" structure, which is pointed by the "index" member of the "a" variable, which has an "S1" structure type.

b.str[j] refers to the "j"-th member of the char array, which is a member of the "b" variable which has an "S2" structure type.

Value numbering may again be used to show that Function 5 is equivalent to Function 2 of the previous example. Even though a complicated and complex pointing structure is encountered in the code segment candidate 120 of Function 5, when value numbers are inserted this also reveals value number set 3, which is equivalent with the value number set 2, corresponding with Function 2 (the code pattern) and with the value number set 1, corresponding with Function 1 (the matched code segment from the first example).

$$V(a[i]_{aas}) = V(b[j+1]_{as})$$

$$V(b[j+1]_{if}) = V(b[j+1]_{as})$$

$$V(a[i]_{bas}) = V(a[i]_{if})\qquad\text{Value Number Set 3}$$

Despite the complex nature of Function 5, following the value numbering equivalence check 140 and operand translation the replacement expression shown in Function 7 may be generated (compare this with the replacement code of Function 3).

$$a.\text{index->}str[i] = \max(a.\text{index->}str[i], b.str[j]);\qquad\text{Function 7}$$

The second example shown above demonstrates how the compiler may be used to optimize complex source code expressions containing structures, pointers and arrays, for instance. Furthermore, the compiler may be implemented in hardware or software run on a suitable computer system.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-ROM or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be a type of connection suitable to transfer signals from or to the respective nodes, units or devices, for example via intermediate devices. Accordingly, unless implied or stated otherwise the connections may for example be direct connections or indirect connections.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 10, for example, from computer readable media such as memory 35 or other media on other computer systems. Such computer readable media may be permanently, removably or remotely coupled to an information processing system such as system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

Also, devices functionally forming separate devices may be integrated in a single physical device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A compiler system for compiling source code comprising:
   a library of code patterns and control flow information for each code pattern in the library, wherein each code pattern comprises one or more variables; and
   a processor arranged to:
      evaluate a control flow of an expression in the source code, wherein the expression comprises one or more variables,
      match the expression to one of the code patterns in the library based on the evaluated control flow information and the control flow information of one of the code patterns in the library,
      assign value numbers to the one or more variables within the expression,
      determine if the expression and the matched code pattern are equivalent based on the assigned value numbers, wherein the equivalence is determined by verifying that value number propagation in the expression is equivalent to the value number propagation in the matched code pattern, and
      replace the expression with a replacement expression if the expression and the matched code pattern are equivalent based on the assigned value numbers.

2. The compiler system according to claim 1, wherein the processor is further arranged to check further conditions prior to replacing the expression in the source code.

3. The compiler system according to claim 1, wherein the matching of the expression and one of the code patterns in the library is further based on control flow graphical structure.

4. The compiler system according to claim 1, wherein the matching of the expression and one of the code patterns in the library is further based on dominating conditions.

5. The compiler system according to claim 1, wherein the expression further comprises any number of each of the following: an operator, an operand, and program logic.

6. The compiler system according to claim 1, wherein the value numbers assignment uses a static single assignment form or a hash table.

7. A method for compiling source code comprising:
   evaluating, by a processor, a control flow of an expression in the source code, wherein the expression comprises one or more variables;
   matching, by the processor, the expression to a code pattern in a library based on the evaluated control flow and a control flow of the code pattern, wherein each code pattern in the library comprises one or more variables;

assigning, by the processor, value numbers to the one or more variables within the expression;

determining, by the processor, if the expression and the matched code pattern are equivalent by verifying that value number propagation in the expression is equivalent to the value number propagation in the matched code pattern; and replacing, by the processor, the expression with a replacement expression if the expression and the matched code pattern are equivalent based on the verified value number promotion in the expression.

8. A compiler system for compiling source code comprising:

a library of code patterns and control flow information for each code pattern in the library, wherein each code pattern comprises one or more variables; and a processor arranged to:

evaluate a control flow of an expression in the source code, wherein the expression comprises one or more variables, match the expression to one of the code patterns in the library based on the evaluated control flow information and the control flow information of one of the code patterns in the library, assign value numbers to the one or more variables within the expression, determine if the expression and the matched code pattern are equivalent by verifying that value number propagation in the expression is equivalent to the value number propagation in the matched code pattern, and replace the expression with a replacement expression if the expression and the matched code pattern are equivalent based on the verified value number propagation in the expression.

9. The compiler system according to claim 8, wherein the processor is further arranged to check further conditions prior to replacing the expression in the source code.

10. The compiler system according to claim 8, wherein the matching of the expression and one of the code patterns in the library is further based on control flow graphical structure.

11. The compiler system according to claim 8, wherein the matching of the expression and one of the code patterns in the library is further based on dominating conditions.

12. The compiler system according to claim 8, wherein the value numbers assignment uses a static single assignment form or a hash table.

13. The compiler system according to claim 8, wherein the expression further comprises any number of each of the following: an operator, an operand, and program logic.

14. The compiler system according to claim 8, wherein the replacement expression and the matched code pattern are different entities associated with each other.

15. The compiler system according to claim 8, wherein the replacement expression and the matched code pattern are associated with each other in the library.

16. The compiler system according to claim 8, wherein the library further comprises value numbers associated with the code patterns.

17. The compiler system according to claim 8, wherein the expression is replaced in the source code or within a representation of the source code stored within the compiler.

18. The compiler system according to claim 8, wherein the replacement expression is generated from the matched code pattern.

19. The compiler system according to claim 18, wherein the replacement expression is further generated from one or more operands of the expression in the source code.

20. The compiler system according to claim 8, wherein the replacement expression is generated from an alternative code pattern associated with the matched code pattern.

* * * * *